Sept. 1, 1931.  F. F. FOWLE  1,821,908
COMPOSITE WIRE CABLE
Filed June 11, 1924  2 Sheets-Sheet 1
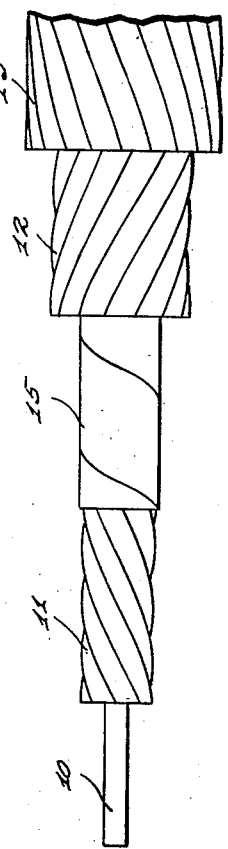
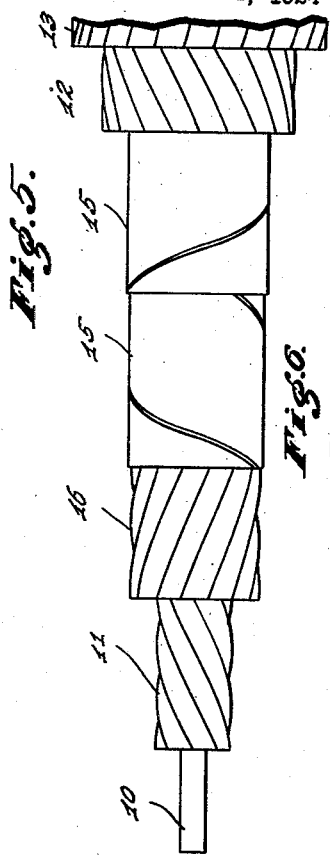
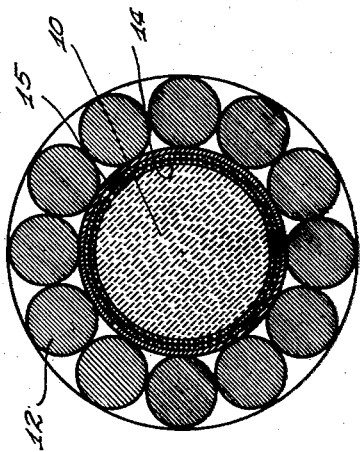
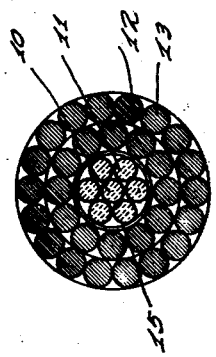
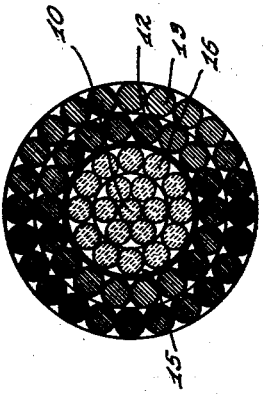
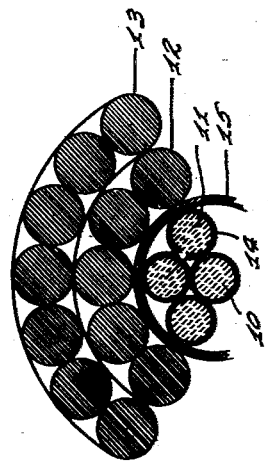
INVENTOR.
FRANK F. FOWLE,
BY
ATTORNEY.

Sept. 1, 1931. F. F. FOWLE 1,821,908
COMPOSITE WIRE CABLE
Filed June 11, 1924   2 Sheets-Sheet 2
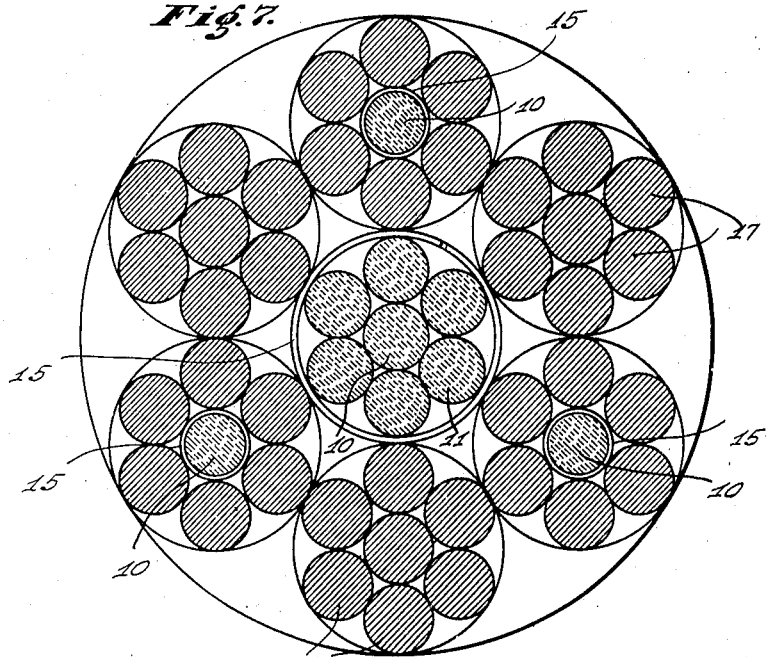
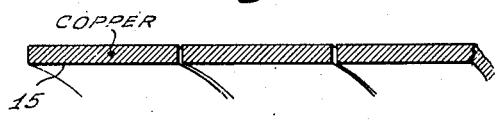
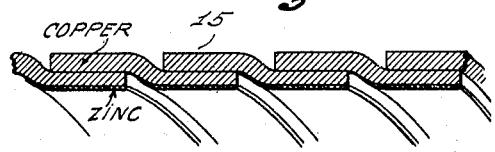
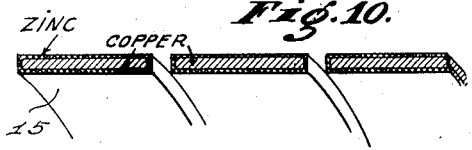
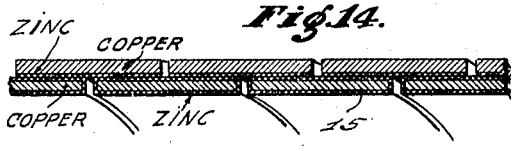
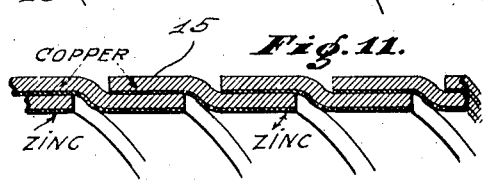
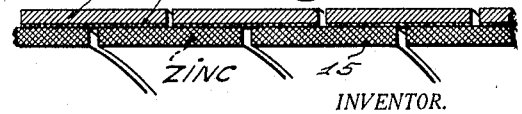
INVENTOR.
FRANK F. FOWLE,
BY
ATTORNEY.

Patented Sept. 1, 1931

1,821,908

UNITED STATES PATENT OFFICE

FRANK F. FOWLE, OF KENILWORTH, ILLINOIS, ASSIGNOR TO INDIANA STEEL & WIRE COMPANY, OF MUNCIE, INDIANA, A CORPORATION OF INDIANA

COMPOSITE WIRE CABLE

Application filed June 11, 1924. Serial No. 719,243.

It is the object of my invention to produce a wire cable of high mechanical strength, low effective electrical resistivity, and high resistance to corrosion.

More specifically, it is the object of my invention to produce a single-conductor wire cable of two principal metals, one for mechanical strength and the other for electrical conductivity, so associated that they will be guarded against corrosion, as from exposure to weather, and the conductors of high conductivity will be advantageously located for carrying electrical current.

In carrying out my invention, speaking generally, I make a wire cable with a core having a surface of one metal and one or more outer layers of wires having surfaces of a different metal. The core may itself be a multi-wire cable if desired, though it is not necessarily so. Desirably the core is of metal of high mechanical strength, such as steel, and an outer layer is of metal of high electrical conductivity, such as copper. The steel wires are desirably zinc-coated. Between the core and an outer layer of different metal I provide an intervening metallic sheath, separate from the wires, and conveniently formed of one or more layers of helically wound metal ribbon. At least the outer surface of this sheath is desirably of a metal which is at least as electro-positive as the surface of the wire layer which it engages. A convenient construction is one with such metal sheath made with its inner and outer surfaces of different metals, with such two metals substantially equally placed in the electromotive-force series of metals with the metals of the surfaces of the cable wires with which they are respectively in contact. In other words, with an outer layer of copper and a core of zinc-coated steel, a desirable construction for the intervening sheath is with an outer surface of copper and an inner surface of zinc; which may be provided by a helically wound bi-metallic ribbon, suitably applied.

The accompanying drawings illustrate my invention: Fig. 1 is a somewhat enlarged transverse section through a concentric-lay wire cable embodying my invention in one form; Fig. 2 is a longitudinal elevation of the cable of Fig. 1, with successive layers cut away progressively in order better to show the construction; Fig. 3 is a further enlargement of a fragment of Fig. 1, to show the coatings on the core wires and the different metals comprising the sheath; Figs. 4 and 5 are views similar to Figs. 1 and 2, showing an intervening sheath formed of a plurality of layers of ribbon; Fig. 6 is an enlarged transverse section similar to Fig. 1, showing the intervening sheath on a single-wire core; Fig. 7 is an enlarged transverse section similar to Fig. 1, showing a modification with a rope lay instead of a concentric lay; and Figs. 8 to 15 inclusive are sectional details showing various arrangements of forming the intervening sheath.

The various cables illustrated are merely examples of a much greater number of forms which my invention may take. In each of these forms there are wires of different metals, separated by an intervening metallic sheath in accordance with my invention.

The wire cable may have any desired lay, such as a concentric lay, as shown in Figs. 1 to 6 inclusive, or a rope lay, as shown in Fig. 7.

In the concentric lay shown, a core and an outer layer are of different metals. The core may be formed either of a single wire, as illustrated in Fig. 6, or as a cable, as illustrated in Figs. 1 to 5. Figs. 1, 2, and 3 show the core as a 7-wire cable, and Figs. 4 and 5 show the core as a 19-wire cable.

In the rope lay shown in Fig. 7, the cable is made of a plurality of strands, each comprising a plurality of wires. The wires of different metals may be associated in various ways in such a rope-lay cable, with such different-metal wires separated in accordance with my invention. For instance, individual strands of the rope-lay cable may themselves be cables embodying my invention, such as those shown in Figs. 1 to 6 inclusive, and/or a central strand may be of wires of one metal, surrounded by strands of which at least the exterior wires are of another metal. Many other variations of the arrangement of wires may be used.

Referring first to the arrangement shown in Figs. 1, 2, and 3:

The concentric-lay cable there shown has a 7-wire core, of steel wire, comprising a single central wire 10 and six wires 11 surrounding such central wire and wound helically thereon. This steel core, provided for greater mechanical strength, is shown with only seven wires, or with only a single layer of wires around the central wire; but that is merely by way of example, as any desired number of wires and layers of wires for the core may be used, as illustrated, for instance, in Figs. 4, 5, and 6. The steel wire or wires of the core desirably have a zinc-coating 14.

Around the steel core 10—11 are any desired number of layers of wires of high conductivity, such as copper or copper-clad steel. In these figures I have shown two layers 12 and 13 of such wires of high conductivity, the layer 12 being close to the layer of steel wires 11 and the layer 13 being superposed upon the layer 12. By making these conductors 12 and 13 with copper at their surfaces, they are inherently quite weather-resistant.

Successive layers of conductors 11, 12, and 13 are desirably wound in opposite directions, in accordance with ordinary practice.

Between the steel core 10—11 and the copper-wire layer 12 I provide an intervening metallic sheath 15. The outer surface of this intervening sheath is of such a metal that it is not electro-negative to the surface-metal of the wires of the layer 12. In other words, when the layer 12 is made of copper wire, the outer surface of the intervening metallic sheath is of a metal which is at least as electro-positive as copper—or at least as high as copper in the electromotive-force series of metals. Desirably the outer surface of such sheath is actually of copper, so that there is no electrolytic action between it and the superposed copper-wire layer; but if such outer surface is of some metal higher than copper in the electromotive-force series of metals, so that it is electro-positive to the superposed copper-wire layer, any electrolytic action which occurs will not cause any corrosion of the copper wires, but only of the surface of the sheath.

If the inner surface of the sheath 15 is directly upon the core wire or wires of different metal from the wire-layer 12, (as is illustrated, and as is desirable though not essential,) I prefer to provide such sheath, in addition to the outer surface just described, with an inner surface which is of a metal substantially equally placed in the electromotive-force series of metals with the surface-metal abutting against it from the inner or core side. For example, if the core is made of zinc-coated steel wires, the inner surface of the sheath is desirably of zinc.

There are various ways of obtaining this sheath. The way I prefer is by forming it of a helically wound metal ribbon or tape. This ribbon or tape may be simply a copper ribbon or tape, as illustrated in Fig. 8; in which case its outer surface abuts against the superposed layer 12 of copper wires, and because the two metals there in contact are both copper there is no electrolytic action between them. While there is a possibility of electrolytic action between the inner surface of such a copper sheath and the zinc coating of the wire or wires of the steel core, yet this possibility is very slight, because very little moisture if any will penetrate into the interior of the sheath.

In place of a simple ribbon or tape of copper, however, it is sometimes desirable to provide a bi-metallic ribbon or tape, with its two surfaces formed respectively of the same metals as the surfaces of the wires which abut against such sheath surfaces. For example, the sheath may be made of a copper ribbon or tape which is zinc-coated on its inner face, as is illustrated in Fig. 9. In that case, the contact at the outer surface of the sheath is copper to copper, and the contact on the inner surface of the sheath is zinc to zinc.

The ribbon or tape forming the sheath is desirably wound with substantially abutting joints if it is only of copper, as is illustrated in Fig. 8, to minimize penetration of moisture into the sheath. It may be wound, however, whether it is formed of a simple copper ribbon or as a bi-metallic ribbon of copper and zinc, with either abutting joints (as shown in Figs. 8 and 9), open joints (as shown in Fig. 10), or overlapping joints (as shown in Figs. 11 and 12). In the last case, with overlapping joints, if the ribbon or tape used is a bi-metallic tape of copper coated with zinc, the coating of zinc may be provided either over the entire inner surface of the tape (as is shown in Fig. 11) or only over that part of the inner surface which is exposed at the inner side of the complete sheath (as is shown in Fig. 12). For example, in the latter case, (Fig. 12,) the inner face of the copper ribbon or tape is zinc-coated only for part of its width.

The sheath may be formed of a single wrapping of metal ribbon or tape (as is illustrated in Figs. 1 to 3 and 6 to 12 inclusive), or may be made of a plurality of wrappings (as illustrated in Figs. 4, 5, 13, 14, and 15). When a plurality of wrappings are used, two wrappings are usually sufficient. In sheaths formed of a plurality of wrappings, adjacent wrappings may be wound either in opposite directions (as shown in Figs. 5 and 13), or in the same direction (as shown in Figs. 14 and 15). When a multi-wrapping sheath is used, it may take various forms, such as an inner wrapping of a copper ribbon zinc-coated on its inner face and having a plain copper ribbon wound on its outer face (as shown in Fig. 13), or an inner wrapping of copper ribbon or tape zinc-coated all over and having superposed upon it a copper ribbon zinc-coated on its inner face only (as shown in Fig. 14), or an inner wrapping of zinc ribbon or tape having superposed upon it a copper ribbon zinc-coated on its inner face (as shown in Fig. 15). Other forms are possible.

In all of the forms specifically described, so far, the outer surface of the sheath is of the same metal as the surfaces of the wires of the layer directly superposed upon it. This is desirable. However, it is not essential in the actual construction of the cable; for the outer surface of the sheath may instead be of a metal which is electro-positive with respect to the surface-metal of the wires of the layer superposed upon the sheath. Thus in Fig. 10 I have shown an arrangement in which the copper ribbon is zinc-coated throughout, both on its outer surface and on its inner surface. While this permits possible electrolytic action between the initial outer surface of the sheath and the abutting surfaces of the superposed layer of copper wires, any resultant corrosion will be merely of the outer zinc-coating of the sheath, and will not result in corrosion of the copper wires themselves.

In the arrangement shown in Figs. 4 and 5, I have shown the core of the cable with nineteen wires, instead of with seven wires as in Figs. 1, 2, and 3; and the sheath is on this 19-wire core. That is, in addition to the central wire 10 and the wire layer 11 directly thereon, there is another layer 16 of wires on the layer 11. The wires 16 may be of the same metal as the wires 10 and 11, or of a different metal; for the wires within the sheath 15 are quite well protected against the weather, and there is little opportunity for electrolytic action even when such wires are of different metals.

In Fig. 6 I have shown the core formed of a single steel wire 10, zinc-coated on its surface; surrounded by a single layer 12 of copper wires, shown as twelve in number. Between the layer of copper wires and the central zinc-coated steel core is an intervening metal sheath 15, having its inner surface of zinc and its outer surface of copper.

In Fig. 7, I have shown one example of a rope-lay cable embodying my invention. The particular cable shown is formed of seven strands, with each strand formed of seven wires. The wires of the central strand are here assumed to be all steel wires 10 and 11, zinc-coated (although this coating is shown in this figure, as it was in Figs. 1 and 2, as a single line, to avoid confusion with the sheaths); and the outer wires 17 of the other six strands are supposed to be all of copper. To separate the central strand from the surrounding strands, I provide around the central strand an intervening sheath 15 according to my invention. This intervening sheath may take any of the forms contemplated by my invention, including all those mentioned. The outer strands of the cable of Fig. 7 may be of any desired character, and need not be all alike. As illustrated, three of such strands are made as seven-wire strands with all the wires of copper; and the other three are shown as seven-wire strands with the outer six wires 17 of copper and the innermost wire 10 of zinc-coated steel. In each of these latter three strands, the central zinc-coated steel wire 10 is separated from the surrounding wires of that strand by an intervening metallic sheath 15 made in accordance with my invention.

If desired, as a further protection, the ribbon or tape used in making the sheath may be coated with varnish or other weather-resisting material, either over the entire ribbon or only at the edges thereof.

While in the examples given of my invention, the metals specifically referred to are elements, I use the term "metal" to include alloys as well as metallic elements. Also, although the sheath 15 is illustrated as directly upon the wires of the core, and the interstices between wires are shown empty, my invention is not limited to these constructions; as the drawings only show cables with these features in order to avoid complications of illustration.

By making the cable with copper outside and steel inside I get many advantages. The steel gives strength; it is protected from the weather; it reduces hysteresis loss, and the so-called skin effect, especially if it is high-carbon steel; it reduces the mechanical stresses on the copper. The copper has high conductivity; it has a large surface for heat radiation; it is in the most efficient position for the transmission of alternating currents.

Claims:

1. A wire cable, comprising a core of zinc-coated steel, a separate metallic sheath surrounding said core and tight upon it, and a layer of wires tight upon said sheath and in direct contact therewith, the surfaces of said layer of wires being of copper, and said sheath having its outer surface of a metal at least as electro-positive as copper and its inner surface of zinc.

2. A wire cable, comprising a core of zinc-coated steel, a separate metallic sheath surrounding said core and tight upon it, and a multi-wire layer of wires of curvilinear cross-section helically wound with a long pitch tight upon said sheath and in direct contact therewith, the surfaces of said layer of wires and the outer surface of said sheath being of copper, said sheath having a joint extending along the cable out of parallelism with the joints between the wires of the superposed layer of wires.

3. A wire cable, comprising a wire core, a separate metallic sheath tight upon said core, and a layer of wires tight upon said sheath and in direct contact therewith, said core including a wire having a surface of a different metal from that of the surfaces of said layer of wires, and said sheath having an outer surface which is of a metal which is at least as electro-positive as the metal of the surfaces of the wires of said layer of wires and having an inner surface of a metal which is the same as that of the surface of the core wire which is of different material from the surfaces of said layer of wires.

4. A wire cable, comprising a wire core, a separate metallic sheath tight upon said core and of bi-metallic tape, and a layer of wires tight upon said sheath and in direct contact therewith, said core including a wire having a surface of a different metal from that of the surfaces of said layer of wires, and said sheath having an outer surface which is of a metal which is at least as electro-positive as the metal of the surfaces of the wires of said layer of wires and having an inner surface of a metal which is the same as that of the surface of the core wire which is of different material from the surfaces of said layer of wires.

5. A wire cable, comprising a wire core, a separate metallic sheath tight upon said core and formed of helically wound metal tape, and a layer of wires tight upon said sheath and in direct contact therewith, said core including a wire having a surface of a different metal from that of the surfaces of said layer of wires, and said sheath having an outer surface which is of a metal which is at least as electro-positive as the metal of the surfaces of the wires of said layer of wires and having an inner surface of a metal which is the same as that of the surface of the core wire which is of different material from the surfaces of said layer of wires.

6. A single-conductor wire cable, comprising a wire core, a layer of helically wound wires around said core, the surfaces of the core being of different metal from the surfaces of said surrounding layer of wires, and a separate metallic sheath interposed between said core and said surrounding layer of wires and in contact with both, the inner and outer surfaces of said sheath being respectively of the same metals as the surface metals of said core and of said surrounding layer of wires respectively.

7. A single-conductor wire cable as set forth in claim 6, with the addition that said sheath is formed of a helically wound metal tape having its inner and outer surfaces of said respective metals.

8. A wire cable as set forth in claim 1, with the addition that said zinc-coated steel core comprises a single zinc-coated wire.

9. A wire cable as set forth in claim 1, with the addition that said zinc-coated steel core comprises a plurality of zinc-coated wires forming a central core-cable.

10. A wire cable as set forth in claim 2, with the addition that said zinc-coated steel core comprises a single zinc-coated wire.

11. A wire cable as set forth in claim 2, with the addition that said zinc-coated steel core comprises a plurality of zinc-coated wires forming a central core-cable.

12. A wire cable, comprising a core of steel, a separate metallic sheath surrounding said core and tight upon it and formed as a short-pitch helix of metal tape, and a multi-wire layer of wires of curvilinear cross-section tight upon said sheath and in direct contact therewith and comprising a plurality of wires in a long-pitch helical winding, the metal of the surfaces of said layer of wires and the metal of the outer surface of said sheath having a relatively high electrical conductivity and being substantially similarly located in the electro-motive force series.

13. A wire cable, comprising a core of steel, a separate metallic sheath surrounding said core and tight upon it and formed as a short-pitch helix, a multi-wire layer of wires of curvilinear cross-section tight upon said sheath and in direct contact therewith and comprising a plurality of wires in a long-pitch helical winding, the metal of the surfaces of said layer of wires and the metal of the outer surface of said sheath having a relatively high electrical conductivity and being substantially similarly located in the electro-motive force series, and the conductors of the sheath and of the wires of said superposed layer being different in cross-sectional shape.

14. A wire cable, comprising a high strength ferrous core, a layer of copper wires surrounding said core, and a separator interposed between said core and said layer of copper wires and mechanically distinct therefrom, said separator consisting of two layers of which the inner one has its inner surface of zinc and the outer one has its outer surface of copper.

15. A wire cable, comprising a high-strength ferrous core, a layer of non-ferrous wires of high electrical conductivity surrounding said core, and a separator interposed between the said core and said layer of wires and mechanically distinct therefrom, said separator consisting of two layers of which the inner one has its inner surface of zinc and the outer one has its outer surface of the same metal as the surface of said layer of wires.

In witness whereof, I have hereunto set my hand at Indianapolis, Indiana, this 7th day of June, A. D. one thousand nine hundred and twenty-four.

FRANK F. FOWLE.